(12) United States Patent
Zhang

(10) Patent No.: US 9,189,145 B2
(45) Date of Patent: Nov. 17, 2015

(54) SYSTEM AND METHOD FOR UNLOCKING TOUCH SCREEN OF ELECTRONIC DEVICE

(71) Applicants: SHENZHEN FUTAIHONG PRECISION INDUSTRY CO., LTD., Shenzhen (CN); Chi Mei Communication Systems, Inc., New Taipei (TW)

(72) Inventor: Ze-Biao Zhang, Shenzhen (CN)

(73) Assignees: SHENZHEN FUTAIHONG PRECISION INDUSTRY CO., LTD., Shenzhen (CN); Chi Mei Communication Systems, Inc., New Taipei (TW)

( * ) Notice: Subject to any disclaimer, the term of this patent is extended or adjusted under 35 U.S.C. 154(b) by 317 days.

(21) Appl. No.: 13/714,558

(22) Filed: Dec. 14, 2012

(65) Prior Publication Data

US 2013/0174067 A1 Jul. 4, 2013

(30) Foreign Application Priority Data

Dec. 29, 2011 (CN) .......................... 2011 1 0450426

(51) Int. Cl.
*G06F 3/048* (2013.01)
*G06F 3/0488* (2013.01)
*G06F 21/36* (2013.01)
*H04M 1/673* (2006.01)

(52) U.S. Cl.
CPC .............. *G06F 3/0488* (2013.01); *G06F 21/36* (2013.01); *H04M 1/673* (2013.01)

(58) Field of Classification Search
USPC .................................. 715/763–765, 862, 864
See application file for complete search history.

(56) References Cited

U.S. PATENT DOCUMENTS

2007/0150826 A1* 6/2007 Anzures et al. ............... 715/772
2012/0133484 A1* 5/2012 Griffin ......................... 340/5.54
2012/0194447 A1* 8/2012 Lin et al. ...................... 345/173

OTHER PUBLICATIONS

Jeremy Roschelle et al.; To Unlock the Learning value of wireless mobile devices, understand coupling; 2002, IEEE Conference Publications, pp. 2-6, DOI: 10.1109/WMTE.2002.1039214.*

* cited by examiner

*Primary Examiner* — Linh K Pham
*Assistant Examiner* — Tam Tran
(74) *Attorney, Agent, or Firm* — Novak Druce Connolly Bove + Quigg LLP

(57) ABSTRACT

In a method to unlock a touch screen of an electronic device, a press operation is received from the touch screen pressed by a user. The touch screen includes an unlocking interface. The method determines whether the press operation is within a press area of the unlocking interface. When the press operation is within the press area, the method further controls an indicator of the unlocking interface to move at a default speed, and locates a stop position of the indicator on the touch screen when the indicator stops moving. The method unlocks the touch screen when the stop position is within a predefined area of the unlocking interface.

15 Claims, 3 Drawing Sheets

SYSTEM AND METHOD FOR UNLOCKING TOUCH SCREEN OF ELECTRONIC DEVICE

BACKGROUND

1. Technical Field

The present disclosure relates to electronic device unlocking technology, and more particularly to a system and method for unlocking a touch screen of an electronic device.

2. Description of Related Art

Many electronic devices (e.g. mobile phones having a touch screen) may be unlocked by making a sliding motion on a touch screen of the electronic devices, pressing a predefined area on the touch screen of the electronic device, or by rotating the electronic devices in a predefined motion. However, the touch screen may be scratched after frequent touches on the touch screen. The above-mentioned unlocking methods may damage the touch screen of the electronic device. Furthermore, the above-mentioned unlocking methods may easily be recognized by unauthorized users, and personal information of the electronic device may be viewed by the unauthorized users. Therefore, there is room for improvement in the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

In general, the word module, as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable storage medium or other storage system. The non-transitory computer-readable storage medium may include CDs, DVDs, BLU-RAY, flash memory, and hard disk drives.

Figure 1:
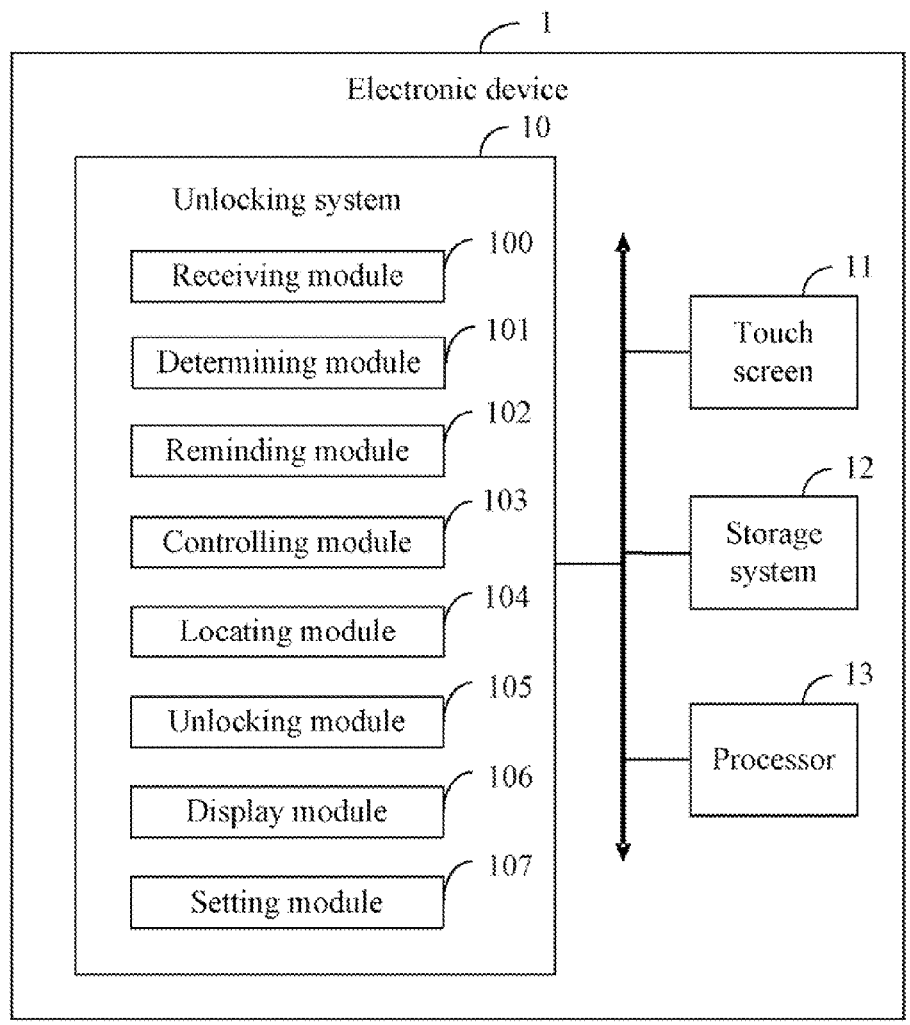
FIG. 1 is a block diagram of one embodiment of an electronic device including an unlocking system.

FIG. 1 is a block diagram of one embodiment of an electronic device 1 including an unlocking system 10. In the embodiment, the electronic device 1 may be a mobile phone, a notebook computer, a personal digital assistant (PDA), for example, comprising a touch screen 11.

Figure 3:
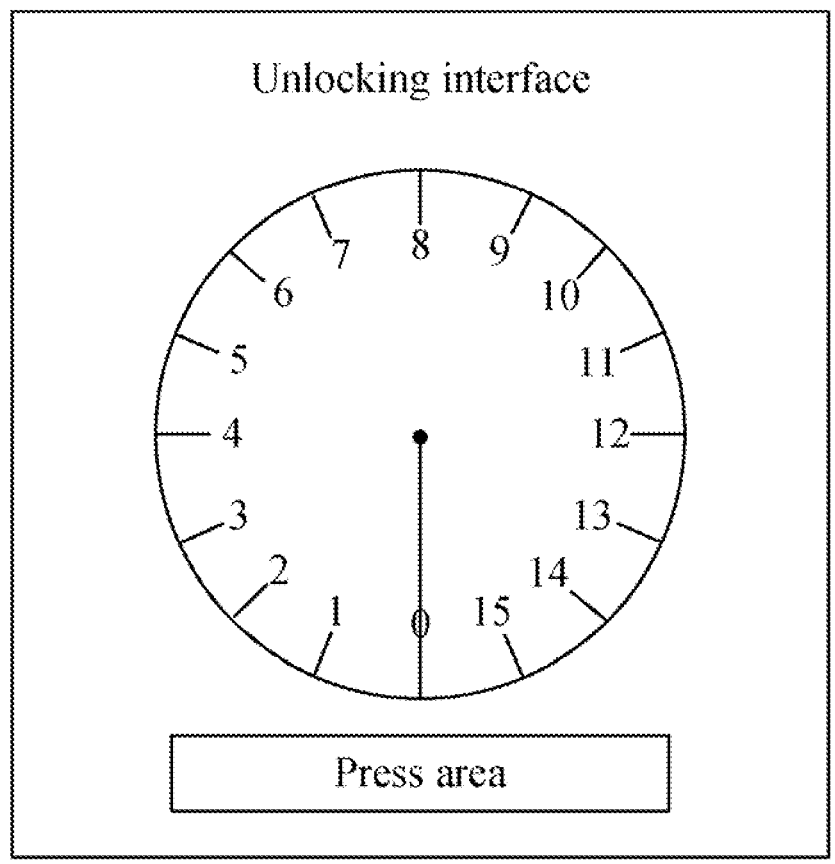
FIG. 3 is a block diagram illustrates an unlocking interface on a touch screen of the electronic device of FIG. 1.

In one embodiment, the touch screen 11 displays an unlocking interface. The unlocking interface comprises a circle that is divided equally into more than one divisions by a predefined value. The predefined value is an integer (e.g. 16) that is user-determined or pre-determined. Each of the divisions is marked with a value in a predefined order. The predefined order is user-determined or pre-determined, and may be used to sort the division values counterclockwise in a descending order, for example. The circle comprises an indicator, which may be a pointer or a sphere. An initial position of the indicator is in one of the divisions of the circle. The unlocking interface further displays a press area that receives a press operation of a user (e.g. a touch within the press area). The press area may be located in the circle or outside of the circle, and may be set in different shapes (e.g. rectangular or circular). Referring to FIG. 3, the circle is divided equally into 16 segments, and the circle comprises a pointer having an initial position. The initial position of the pointer is at division 0 of the circle. The press area is located outside of the circle.

In one embodiment, the unlocking system 10 receives a press operation that is pressed on the touch screen 11 by a user. The unlocking system 10 further detects whether the indicator stops within a predefined area when the press operation is stopped pressing on the touch screen 11, and unlocks the touch screen 11 when the indicator stops within the predefined area. The predefined area can trigger the touch screen 11 to unlock, and is any range of the division values or a single division value. Referring to FIG. 3, the predefined area may be any range, or a single division value, between 0 and 15 (e.g. the range is [2, 3]).

The electronic device 1 further includes a storage system 12 and at least one processor 13. The storage system 12 stores data of the electronic device 1. In one embodiment, the storage system 12 may be an internal storage system, such as a random access memory (RAM) for temporary storage of information, and/or a read only memory (ROM) for permanent storage of information. In some embodiments, the storage system 12 may also be an external storage device, such as an external hard disk, a storage card, or a data storage medium. The at least one processor 13 executes one or more computerized codes and other applications of the electronic device 1 to provide the functions of the unlocking system 10.

In one embodiment, the unlocking system 10 may include a receiving module 100, a determining module 101, a reminding module 102, a controlling module 103, a locating module 104, an unlocking module 105, a display module 106, and a setting module 107. The modules 100-107 comprise computerized codes in the form of one or more programs that are stored in the storage system 12 of the electronic device 1. The computerized code includes instructions that are executed by the at least one processor 13 of the electronic device 1 to provide functions for the modules. Details of each of the modules are given in FIG. 2.

Figure 2:
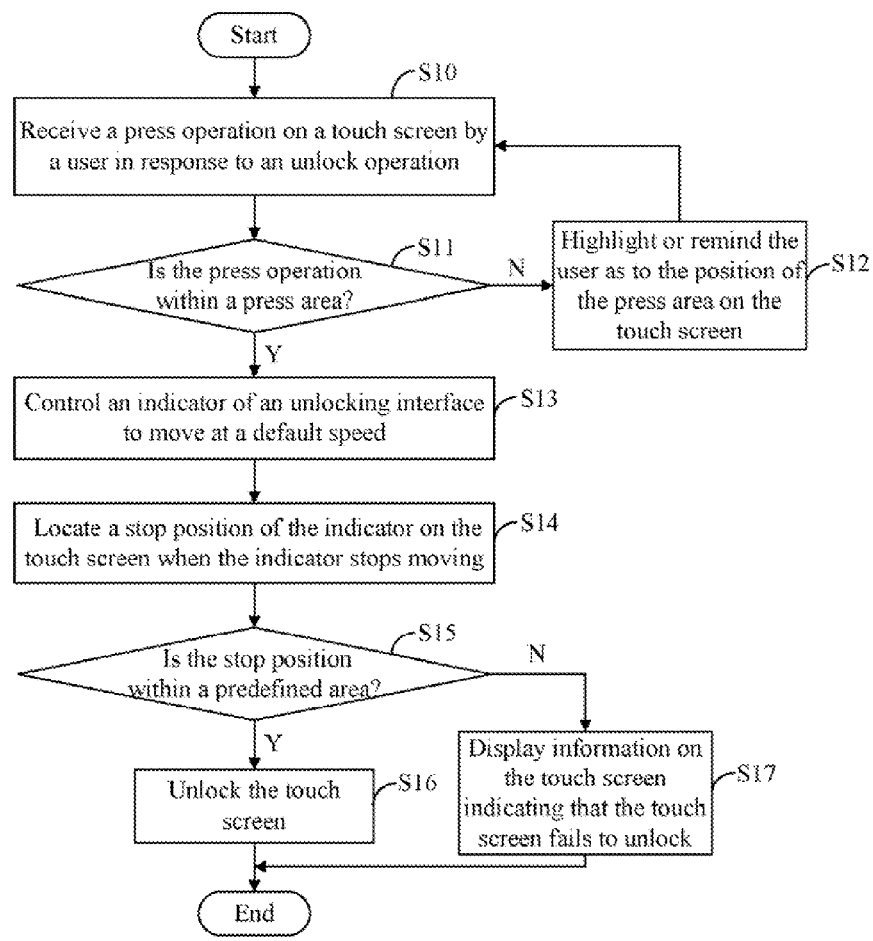
FIG. 2 is a flowchart of one embodiment of a method for unlocking a touch screen of the electronic device of FIG. 1.

FIG. 2 is a flowchart of one embodiment of a method for unlocking a touch screen of the electronic device of FIG. 1. Depending on the embodiment, additional steps may be added, others deleted, and the ordering of the steps may be changed.

In step S10, the receiving module 100 receives a press operation that is pressed on the touch screen 11 by a user when the user needs to unlock the touch screen 11. In one embodiment, the press operation is in response to an unlock operation (e.g. pressing an unlocking button).

In step S11, the determining module 101 determines whether the press operation is within the press area. If the press operation is not within the press area, step S12 is implemented. If the press operation is within the press area, step S13 is implemented.

In step S12, the reminding module 102 highlights or otherwise reminds the user as to the position of the press area on the touch screen 11, and step S10 is repeated.

In step S13, the controlling module 103 controls the indicator to move at a default speed. In one embodiment, the default speed is the number of divisions that the indicator can move per second. For example, the indicator can move through one or two divisions per second.

In step S14, the locating module 104 locates a stop position of the indicator on the touch screen 11 when the indicator stops moving. The stop position is a position in which the indicator has stopped. In one embodiment, the locating module 104 obtains a moving distance of the indicator according to the default speed and a time that the indicator has been moving (e.g. the default speed is multiplied by the movement time), and obtains a stop value by adding the moving distance to the division value corresponding to the initial position of the indicator. If the stop value is less than the predefined value, the locating module 104 locates the position corresponding to the stop value as the stop position. If the stop value is not less than the predefined value, the locating module 104 obtains a subtracted value by subtracting the predefined value from the stop value, and locates the position corresponding to the subtracted value as the stop position.

In step S15, the locating module 104 determines whether the stop position is within the predefined area. If the stop position is within the predefined area, step S16 is implemented. If the stop position is not within the predefined area, step S17 is implemented.

In step S16, the unlocking module 105 unlocks the touch screen 11 when the stop position is within the predefined area.

In step S17, the display module 106 displays information on the touch screen 11 indicating that the touch screen 11 fails to unlock when the stop position is not within the predefined area, and returns to the unlocking interface.

In one embodiment, the setting module 107 sets the unlocking interface according to data inputting by the user. The setting module 107 may set the position of the press area, the initial position of the indicator, and the predefined area, for example. The predefined area is a single division value or any range of the division values. If the predefined area is small, the probability of the electronic device 1 being unlocked by chance is small when the user does not know the predefined area. Referring to FIG. 3, a smaller predefined area [2, 3] is more secure than a larger predefined area [2, 4].

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included within the scope of this disclosure and the described inventive embodiments, and the present disclosure is protected by the following claims.

What is claimed is:

1. A computerized-method for unlocking a touch screen of the electronic device, the method comprising:
   receiving a press operation pressed on the touch screen by a user;
   determining whether the press operation is within a press area of an unlocking interface of the touch screen, wherein the unlocking interface comprises a circle that is divided equally into more than one division by a predefined value;
   controlling an indicator of the unlocking interface to move at a default speed when the press operation is within the press area, wherein the default speed is the number of divisions that the indicator moves per second;
   locating a stop position of the indicator on the touch screen when the indicator stops moving comprising: obtaining a moving distance of the indicator according to a default speed and a time that the indicator has been moving; obtaining a stop value by adding the moving distance to a division value corresponding to an initial position of the indicator; locating the position corresponding to the stop value as the stop position when the stop value is less than a predefined value; and obtaining a subtracted value by subtracting the predefined value from the stop value and locating the position corresponding to the subtracted value as the stop position when the stop value is not less than the predefined value;
   determining whether the stop position is within a predefined area of the unlocking interface;
   unlocking the touch screen when the stop position is within the predefined area; and
   displaying information on the touch screen indicating that the touch screen fails to unlock when the stop position is not within the predefined area.

2. The method as claimed in claim 1, wherein each of the divisions is marked with a value in a predefined order.

3. The method as claimed in claim 1, wherein the indicator is included in the circle of the unlocking interface, and an initial position of the indicator is in one of the divisions of the circle.

4. The method as claimed in claim 1, further comprising:
   setting a position of the press area of the unlocking interface, an initial position of the indicator, and the predefined area of the unlocking interface, wherein the predefined area is a single division value or any range of the division values.

5. The method as claimed in claim 1, further comprising:
   highlighting or reminding the user as to the position of the press area on the touch screen when the press operation is not within the press area.

6. A non-transitory computer readable storage medium storing a set of instructions that, when executed by at least one processor of an electronic device, causes the at least one processor to perform a method for unlocking a touch screen of the electronic device, the method comprising:
   receiving a press operation pressed on the touch screen by a user; determining whether the press operation is within a press area of an unlocking interface of the touch screen, wherein the unlocking interface comprises a circle that is divided equally into more than one division by a predefined value;
   controlling an indicator of the unlocking interface to move at a default speed when the press operation is within the press area, wherein the default speed is the number of divisions that the indicator moves per second;
   locating a stop position of the indicator on the touch screen when the indicator stops moving comprising: obtaining a moving distance of the indicator according to a default speed and a time that the indicator has been moving; obtaining a stop value by adding the moving distance to a division value corresponding to an initial position of the indicator; locating the position corresponding to the stop value as the stop position when the stop value is less than a predefined value; and obtaining a subtracted value by subtracting the predefined value from the stop value and locating the position corresponding to the subtracted value as the stop position when the stop value is not less than the predefined value;
   determining whether the stop position is within a predefined area of the unlocking interface; unlocking the touch screen when the stop position is within the predefined area; and
   displaying information on the touch screen indicating that the touch screen fails to unlock when the stop position is not within the predefined area.

7. The storage medium as claimed in claim 6, wherein each of the divisions is marked with a value in a predefined order.

8. The storage medium as claimed in claim 6, wherein the indicator is included in the circle of the unlocking interface, and an initial position of the indicator is in one of the divisions of the circle.

9. The storage medium as claimed in claim 6, wherein the method further comprises:
setting a position of the press area of the unlocking interface, an initial position of the indicator, and the predefined area of the unlocking interface, wherein the predefined area is a single division value or any range of the division values.

10. The storage medium as claimed in claim 6, wherein the method further comprises:
highlighting or reminding the user as to the position of the press area on the touch screen when the press operation is not within the press area.

11. An electronic device, comprising: a touch screen comprising an unlocking interface; a storage system; at least one processor; and one or more programs that are stored in the storage system and executed by the at least one processor, the one or more programs comprising:
a receiving module that receives a press operation pressed on the touch screen by a user;
a determining module that determines whether the press operation is within a press area of the unlocking interface, wherein the unlocking interface comprises a circle that is divided equally into more than one division by a predefined value;
a controlling module that controls an indicator of the unlocking interface to move at a default speed when the press operation is within the press area, wherein the default speed is the number of divisions that the indicator moves per second;
a locating module that locates a stop position of the indicator on the touch screen when the indicator stops moving comprising: obtaining a moving distance of the indicator according to a default speed and a time that the indicator has been moving; obtaining a stop value by adding the moving distance to a division value corresponding to an initial position of the indicator; locating the position corresponding to the stop value as the stop position when the stop value is less than a predefined value; and obtaining a subtracted value by subtracting the predefined value from the stop value and locating the position corresponding to the subtracted value as the stop position when the stop value is not less than the predefined value; and determines whether the stop position is within a predefined area of the unlocking interface;
an unlocking module that unlocks the touch screen when the stop position is within the predefined area; and
a display module that displays information on the touch screen indicating that the touch screen fails to unlock when the stop position is not within the predefined area.

12. The electronic device as claimed in claim 11, wherein each of the divisions is marked with a value in a predefined order.

13. The electronic device as claimed in claim 11, wherein the indicator is included in the circle of the unlocking interface, and an initial position of the indicator is in a one of the divisions of the circle.

14. The electronic device as claimed in claim 11, wherein the one or more programs further comprise:
a setting module that sets a position of the press area of the unlocking interface, an initial position of the indicator, and the predefined area of the unlocking interface, wherein the predefined area is a single division value or any range of the division values.

15. The electronic device as claimed in claim 11, wherein the one or more programs further comprise:
a reminding module that highlights or reminds the user as to the position of the press area on the touch screen when the press operation is not within the press area.

* * * * *